Patented May 2, 1950

2,506,014

UNITED STATES PATENT OFFICE 2,506,014

POLYVINYL ACETAL COMPOSITIONS

Francis Joseph Curtis, St. Louis, Mo., assignor to Monsanto Chemical Company, St. Louis, Mo., a corporation of Delaware No Drawing. Application September 4, 1948, Serial No. 47,939

3 Claims. (Cl. 260—33.8)

This invention relates to improved compositions of matter comprising polyvinyl acetal resins. More particularly, this invention relates to improved compositions of matter comprising polyvinyl acetal resins and "still residues" from the preparation of chlorinated diphenyls and chlorinated diphenyl benzenes and mixtures of the same.

An object of this invention is to provide an improved polyvinyl acetal resin composition.

Another object is to provide an improved polyvinyl acetal resin composition for use in producing improved sound recording disks.

These and other objects are attained by the incorporation of still residues from the preparation of chlorinated diphenyls and diphenyl benzenes in polyvinyl acetal compositions.

Exemplifications of the compositions of this invention follow. Where parts are mentioned, they are parts by weight.

*Example I*

| | Parts |
|---|---|
| Polyvinyl butyral | 100 |
| Still residue (melting point 172° C.) | 50 |
| Candelilla wax | 5 |

The polyvinyl butyral used contained 18% hydroxyl groups calculated as polyvinyl alcohol, 2.5% acetate groups calculated as polyvinyl acetate and the remainder was butyral groups. The ingredients in a dry pulverulent form were masticated on heated malaxating rolls and then calendered into thin sheets. The sheets did not soften or distort when treated for 10 hours at 65° C. and 100% relative humidity in contradistinction to unmodified polyvinyl butyral which softens below 50° C. at 100% relative humidity.

*Example II*

| | Parts |
|---|---|
| Polyvinyl butyral | 100 |
| Still residue (melting point 230° C.) | 100 |

The polyvinyl butyral was the same as that used in Example I. The ingredients in pulverulent form were masticated on heated malaxating rolls, taken from the rolls in thin sheets and then polished in a normal planishing operation. The sheets withstood 24 hours at 65° C. and 100% relative humidity without softening or distorting.

*Example III*

| | Parts |
|---|---|
| Polyvinyl formal | 100 |
| Still residue (melting point 172° C.) | 50 |
| Candelilla wax | 5 |

The polyvinyl formal contained 8% OH groups calculated as polyvinyl alcohol, 11% acetate groups calculated as polyvinyl acetate and the balance formal groups. The ingredients were mixed in a heated Banbury mixer, molded into a block and skived to provide thin sheets. The sheets did not distort on prolonged heating at 65° C. and 100% relative humidity.

The polyvinyl acetal resins of this invention may be prepared, for example, by hydrolyzing a polyvinyl ester, for example, polyvinyl acetate, and then reacting the resulting hydrolysis product with an aldehyde. These resins may contain a certain proportion of ester and hydroxyl groups in addition to the acetal groups. U. S. patent to Morrison et al., Re. 20,430, dated June 20, 1937, illustrates suitable methods for preparing such resins.

The polyvinyl acetal resins may be made using various aldehydes or mixtures thereof, or even ketones containing an active carbonyl group. Thus, formaldehyde, acetaldehyde, propionaldehyde, butyraldehyde, valeraldehyde, hexaldehyde, benzaldehyde, cyclohexanone and the like and mixtures thereof may be employed. In general, polyvinyl acetal resins made from lower aliphatic aldehydes are preferred and, in particular, polyvinyl acetal resins made with saturated aliphatic aldehydes containing less than 6 carbon atoms and especially those made with butyraldehyde, are especially useful. When the polyvinyl acetal resins contain ester groups, the nature of the ester groups may be substantially varied, but are preferably residues of saturated lower aliphatic acids such as acetic, propionic and butyric.

The polyvinyl acetal resins employed herein generally contain, on a weight basis, at least 5% hydroxyl groups calculated as polyvinyl alcohol and preferably, from 5 to 25% hydroxyl groups. These resins also contain from 0 to 30% ester groups calculated as polyvinyl ester, the ester groups preferably being acetate.

According to one embodiment of this invention, when the acetal groups are butyraldehyde acetal, the resins employed may be considered to be made up, on a weight basis, of 12–22% hydroxyl groups calculated as polyvinyl alcohol and from 15–30% acetate groups calculated as polyvinyl acetate and the balance substantially acetal. According to another embodiment, when the acetal groups are butyraldehyde acetal, the resins employed may be considered to be made up, on a weight basis, of 16–20% hydroxyl groups calculated as polyvinyl alcohol, less than 3% acetate groups calculated as polyvinyl acetate and the balance substantially butyraldehyde acetal.

According to another embodiment of this invention, when the acetal groups are acetaldehyde acetal, the polyvinyl acetal resin employed may be considered to be made up, on a weight basis, of 5–15% hydroxyl groups calculated as polyvinyl alcohol, 15–20% acetate groups calculated as polyvinyl acetate and the balance substantially acetaldehyde acetal.

In still another embodiment of this invention, when the acetal is formaldehyde acetal, the polyvinyl acetal resin may be considered to be made up, on a weight basis, of 5–10% hydroxyl groups calculated as polyvinyl alcohol, 10–15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2–6% acetate groups calculated as polyvinyl acetate and the balance 65–50 mol per cent acetaldehyde acetal and 35–50 mol per cent butyraldehyde acetal.

The still residues of this invention are high melting by-products formed during purification by distillation of chlorinated diphenyls, chlorinated diphenyl benzenes, or mixtures thereof. They generally comprise mixtures of chlorinated diphenyl benzenes, chlorinated tri-ortho-phenylene, chlorinated high polymers of diphenyl benzene and chlorinated polyphenyls. The still residues contain 50–60% chlorine and have melting points ranging from 50–250° C.

The still residues are the by-products of a process which includes the steps of heating pure benzene or a mixture of benzene, toluene and xylene to temperatures at which diphenyls or terphenyls are formed, distilling the product to remove unconverted or partially converted materials that boil below 200° C., chlorinating the resultant residue and finally distilling the chlorinated mixture to obtain pure chlorinated diphenyls or chlorinated terphenyls.

During the treatment of the benzene or benzene-toluene-xylene mixtures to form diphenyls and terphenyls, a small amount of polymeric material made up predominantly of tri-ortho-phenylene, polymers of diphenyl benzene and polyphenyls, is formed. In general, these materials are the only impurities in the product and it has been found more economical to remove them after the chlorination step than prior to said step.

The distillation of the chlorinated mixture is carried out at temperatures ranging from 250° C. to 420° C. at atmospheric pressure to remove from the mixture the chlorinated diphenyl or chlorinated diphenyl benzene. When the final distillation step must be at the temperature on the high side of the cited range, it is frequently adventitious to perform the distillation at reduced temperatures and pressures such as, for example, from 230° C.–340° C. at 4–5 mm. mercury absolute pressure. After distillation, there remains a still residue which consists essentially of the higher boiling chlorinated polyphenyl compounds. The nature of these compounds depends on temperature and duration of the thermoforming step which depends in turn on the product desired, i. e., diphenyls, terphenyls, or mixtures thereof.

The resulting still residues have melting points of from 50 to 250° C. and contain from 50–60% chlorine. They are made up essentially of chlorinated polyphenyl compounds including chlorinated tri-ortho-phenylene, chlorinated diphenyl benzene polymers and other chlorinated polyphenyl compounds.

The still residues may be incorporated in the polyvinyl acetals by any of the normal processing steps, for example, the residue and resin may be mixed with or without solvent in a Banbury or other suitable mixing machine, or on hot milling rolls. The plastic mass may then be further processed by extrusion, calendering, or rolling into blocks which are consolidated by heat and pressure and subsequently skived into sheets of desired thickness.

The still residues are compatible in all proportions with polyvinyl acetals and may be used in any desired amount, for example, 100 parts by weight of polyvinyl acetal may be modified with 0 to 100 parts by weight of still residue. The amount of still residue used may be varied according to the particular properties desired in the finished product and depending on the properties of the particular residue used. Waxes, natural or synthetic resins, plasticizers, solvents, fillers, pigments and dyes may be added to the products of this invention to further modify the properties of the polyvinyl acetal resins to obtain advantageous properties in the finished product.

The compositions of this invention are particularly useful for sound recording disks where resistance to temperature and humidity changes are of paramount importance. Such disks also exhibit a remarkable fidelity of pitch and tone reproduction with a minimum of ground noises. The compositions may be used as the complete disk, or may be laminated with paper, wood, metal or other sheet material in such a manner that the top of the recording surface is the composition of this invention. The compositions may also be dissolved in a solvent and coated on a base of metal, paper, wood or other material to form a recording surface.

The coupling of good electrical properties with heat and moisture resistance shown by the compositions of this invention is of particular value in the field of electrical insulation.

This application is a continuation-in-part of my application Serial No. 572,245, filed January 10, 1945, now abandoned.

It is to be understood that the foregoing description of this invention is intended to be illustrative thereof and is not to be construed as limiting the invention as defined in the appended claims.

What is claimed is:

1. A composition of matter consisting essentially of a polyvinyl acetal resin and a still residue obtained as a by-product in the process which includes the steps of heating a compound taken from the group consisting of benzene and mixtures thereof with toluene and xylene to temperatures at which diphenyls and terphenyls are formed, distilling the product to remove unconverted materials that boil below 200° C., chlorinating the resultant residue and distilling the chlorinated mixture at 250 to 420° C. to remove therefrom pure chlorinated diphenyls and chlorinated terphenyls, said still residue consisting essentially of chlorinated polyphenyl compounds taken from the group consisting of chlorinated tri-ortho-phenylene and chlorinated diphenyl benzene polymers, said residue having a melting point of from 50 to 250° C. and a chlorine content of 50 to 60%, said composition containing up to 100 parts of still residue per 100 parts of polyvinyl acetal resin.

2. A composition of matter as in claim 1 wherein the polyvinyl acetal resin is a polyvinyl butyraldehyde acetal resin.

3. A composition of matter as in claim 1 wherein the polyvinyl acetal resin is a polyvinyl formaldehyde acetal resin.

FRANCIS JOSEPH CURTIS.

REFERENCES CITED

The following references are of record in the file of this patent:

UNITED STATES PATENTS

| Number | Name | Date |
|---|---|---|
| 2,062,815 | Matheson | Dec. 1, 1936 |
| 2,098,535 | Charch | Nov. 9, 1937 |
| 2,308,530 | McManus | Jan. 19, 1943 |

OTHER REFERENCES

Monsanto Plasticizers and Resins, pub. May 1949, by Monsanto Chem. Co., St. Louis, pages 32, 33, 34 and 39.